Aug. 22, 1961     L. GREINER     2,996,880
REACTION PROPULSION SYSTEM AND ROCKET
Filed Oct. 14, 1958     2 Sheets-Sheet 1
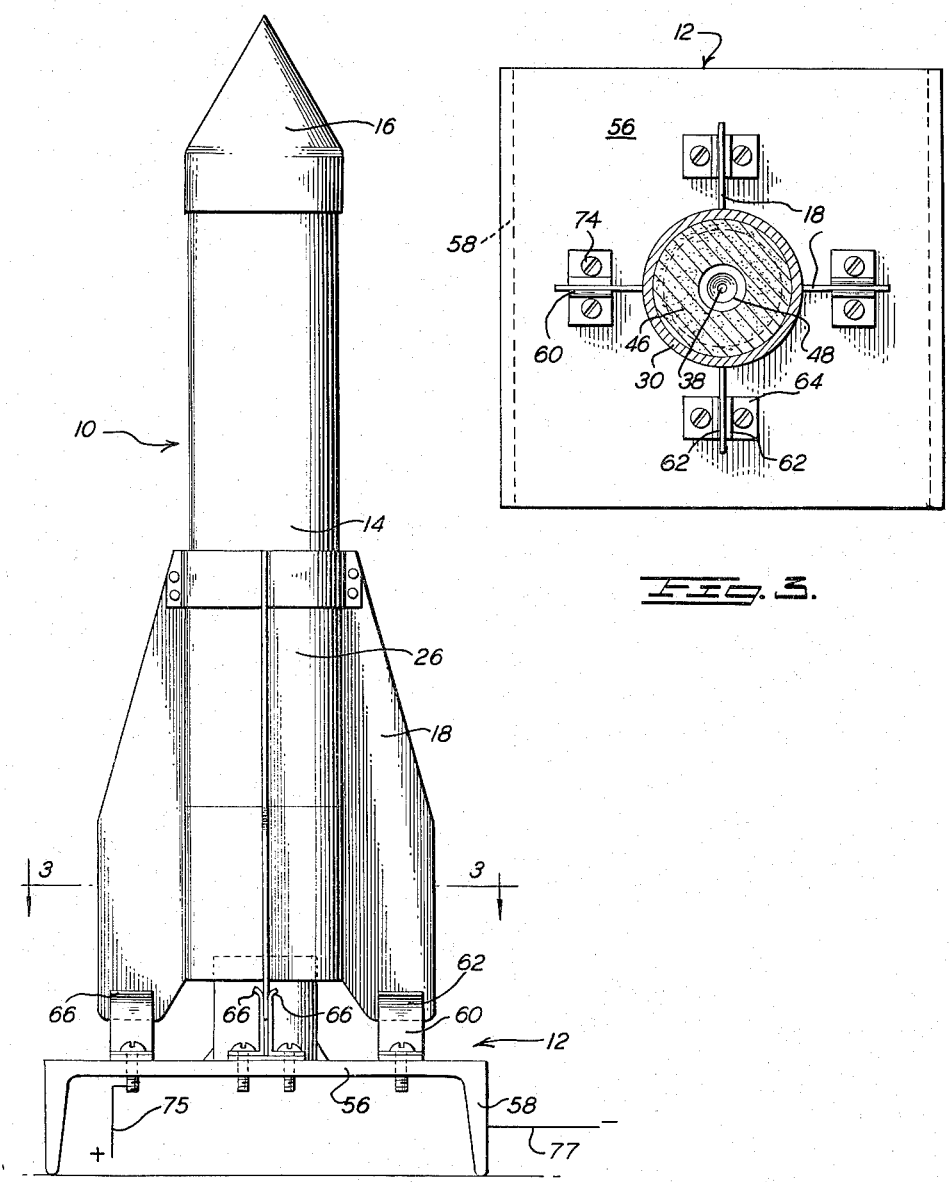
INVENTOR.
LEONARD GREINER
BY Harold T. Stowell
Harold L. Stowell
ATTORNEYS

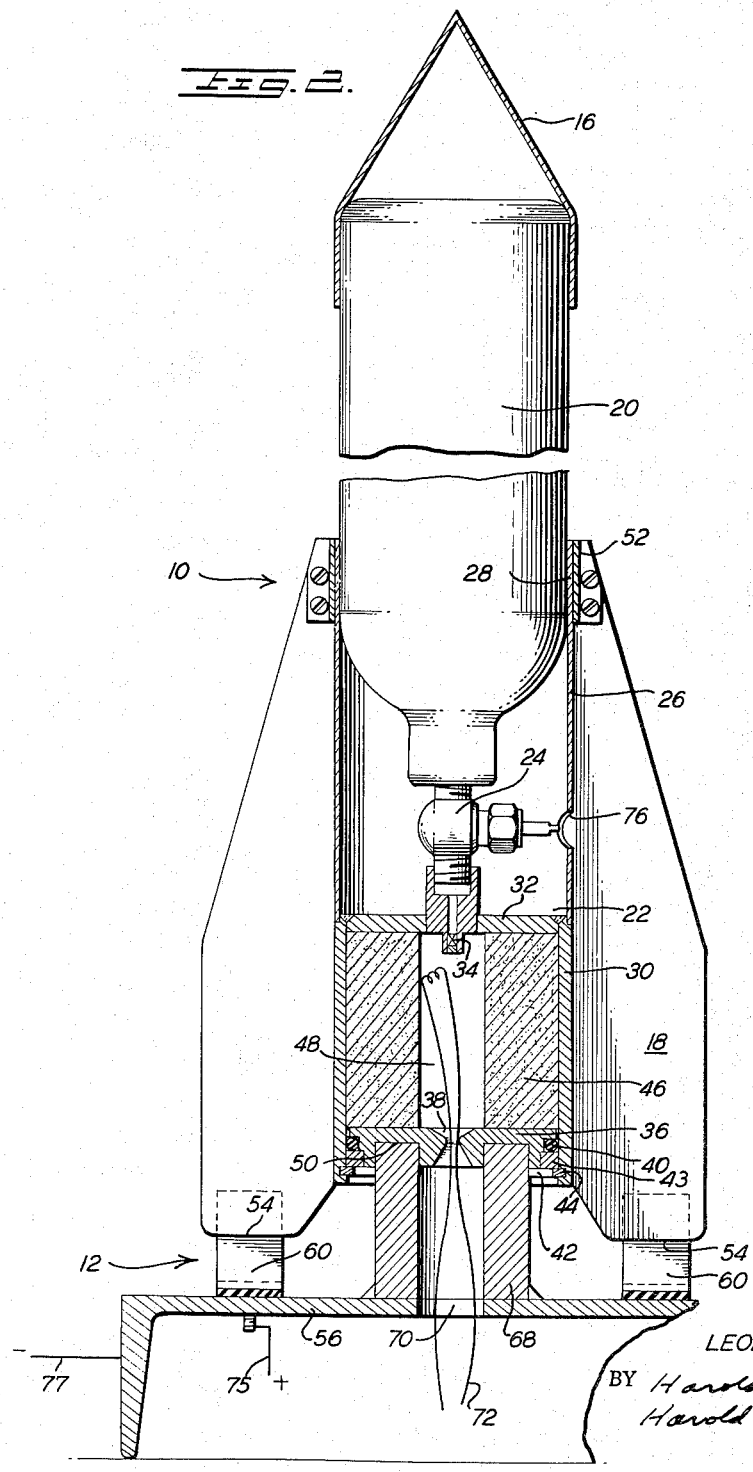

United States Patent Office 2,996,880
Patented Aug. 22, 1961

2,996,880
REACTION PROPULSION SYSTEM
AND ROCKET
Leonard Greiner, Richmond, Va., assignor to Texaco Experiment Incorporated, a corporation of Virginia
Filed Oct. 14, 1958, Ser. No. 767,141
1 Claim. (Cl. 60—35.6)

This invention relates generally to rockets and airborne missiles and more particularly and specifically to a rocket or missile incorporating a novel and improved propulsion unit or system and launching means for the rocket cooperating with the propulsion means.

It is a general object of this invention to provide a new and improved rocket incorporating a unique propulsion system wherein the component assembly is characterized by extreme simplicity of construction and of operation.

Another object of this invention lies in the provision of a unique rocket having an improved propulsion system which utilizes propellant materials affording a maximum operating safety factor.

It is another object of this invention to provide a rocket or airborne missile incorporating in combination therewith a propulsion system which results in the attainment of positive operation of the missile with a minimum of safety risk to operating personnel.

A still further object of this invention lies in the provision of a new and improved rocket and propulsion system therefor which is of extremely simple and low cost design, construction and operation without sacrifice of efficiency or personnel safety.

A further object is to provide a propulsion system having a high specific impulse.

Another object is to provide such a system wherein the oxidizer and fuel are relatively inexpensive and readily available in substantial quantities.

Still further objects and advantages of the present invention will become more readily apparent to those skilled in the art when the following description is considered in the light of the appended drawings.

The nature of the present invention may be stated in general terms as relating primarily to a rocket and rocket propulsion system combining therewith a launching device wherein the combined structures include a rocket body containing a pressure receptacle, a valved outlet on the rear end of the receptacle, a combustion chamber rearwardly of the outlet, a reaction outlet in the rear of the combustion chamber, nitrous oxide contained under pressure in said receptacle, a carbon charge fixed in said combustion chamber, and launching means vertically supporting said rocket and providing an electrical starting circuit for ignition of the carbon charge in the combustion chamber.

Referring now to the accompanying drawings in which like characters designate similar parts throughout the several views:

FIG. 1 is a side elevation of the novel rocket supported on the launching means therefor;

FIG. 2 is a fragmentary vertical section of the apparatus shown in FIG. 1; and

FIG. 3 is a horizontal sectional view substantially on line 3—3 of FIG. 1.

The inventive concepts herein disclosed and claimed relate primarily to a rocket and rocket propulsion system but, in part, to a novel launching pad or platform for said rocket. In the accompanying drawings 10 generally designates the rocket while the platform or pad adapted for supporting and launching the rocket is illustrated generally at 12.

The rocket and its incorporated propulsion system includes a body portion 14 having a conical nose section 16 on what would be the uppermost end thereof when supported in a launching position and stabilizer fins 18 longitudinally of the lower, rearward end of the body. The body portion is divided into two sections classified generally as the forward tank or receptacle section 20 and the rearward or tail thrust section 22.

For purposes of more clearly illustrating the novel construction and extreme simplicity of the inventive concepts herein involved the forward section 20 of the rocket is shown in the form of a conventional laboratory pressure cylinder in an inverted position and having the conical nose piece 16 suitably secured on the base end of the cylinder and a valve structure 24 secured on the rearward end thereof.

A tubular skirt 26 is secured about the cylinder, as at 28, to project downwardly and rearwardly therefrom to encircle and enclose therewithin the valve 24. The skirt 26 carries a tubular combustion chamber 30 in fixed extension rearwardly therefrom which chamber is closed at its forward end by a front plate 32 which receives centrally thereof a nozzle member 34 establishing communication between the valve 24 and the combustion chamber. A fusible plug 35 closes the nozzle 34 prior to operation of the rocket.

At the rearward end of the combustion chamber is a nozzle or thrust plate 36 which has a central de Laval nozzle 38 therethrough.

The thrust plate is provided with a circular sealing ring 40 about the circumference thereof normally engaging the inner wall of the combustion chamber and the plate is retained in place by a snap ring 42 engaging in an annular groove 44 in the inner wall of the lower end of the combustion chamber outwardly from sealing ring 40. The snap ring 42 engages electrical insulating ring 43 which in cooperation with sealing ring 40 electrically insulates the thrust plate 36 from the body of the rocket. The combustion chamber is provided with a tubular charge 46 of carbon, in graphite or amorphous form, which defines centrally thereof a chamber 48 within the combustion chamber between the injection nozzle 34 and the de Laval nozzle 38. The rearward, outward face of the thrust plate 36 is provided with an annular recessed channel 50 concentrically about the de Laval nozzle 38 which channel cooperates with the launching means 12 in supporting the rocket in launching position as will hereinafter appear.

The stabilizers 18 take the form of planar fins which are equally spaced concentrically around the rearward skirted end of the rocket to extend in projection beyond the rearward end of the thrust plate 36. The stabilizer fins are secured at their upper end by a retaining ring 52 or like crimping means positioned about the forward end of the skirt 26 and overlying the receptacle or tank portion 20 of the body. The rearward ends of the stabilizer fins terminate in straight edges 54 perpendicularly to the longitudinal axis of the rocket.

The launching pad or platform 12 consists of a plate 56 supported in an elevated position by plural leg members 58 spaced thereabout and is provided in spaced locations about its upper face with plural spring brackets 60. Each spring bracket 60 consists of a pair of metallic leaves or tongues 62 supported vertically from a base plate 64. The base plates 64 and connectors 74 are spaced from the platform plate 56 by electrical insulation means 57 while the upper extremities of the brackets 60 are flared as at 66 in opposite directions. The radial spacing of the spring brackets 60 about the upper face of the plate 56 is such that the rearward or lower ends of stabilizer fins 18 of the rocket will coincide one with each of said brackets when a rocket is positioned vertically above the center of the platform.

The platform additionally carries a tubular post 68 centrally thereof and concentrically about a center opening 70 in the plate 56 of the platform, which post extends vertically above the upper extremes of the spring brackets 60. The diameter and thickness of the tubular post 68 is such as will permit it to register with and telescope within the annular groove 50 in the lower rear face of the thrust plate 36 of the rocket. When the rocket is supported on the post 68 the rearward ends of each of the stabilizer fins 18 will be caused to be inserted vertically between the leaves 62 of the spring brackets 60 therebeneath which leaves will be maintained by their resilient character in close frictional contact one each with each of the opposed faces of the inserted fin.

In operation of the rocket hereinbefore described the needle valve 24 on the pressure tank is opened manually through the access opening 76 provided in the skirt 26 to permit the pressurized oxidizer within the tank to flow up to the fusible plug 35 in the outlet passage of injection nozzle 34. Then, the carbon charge 46 within the combustion chamber is heated by connecting one lead 75 of a source of current to one or more of the brackets 60 and the other lead 77 of the source of current to the metallic base 56 of the launching stand whereby the current is caused to flow through the carbon charge 46 and bring it to reactive heat. Instead of using the carbon charge as a resistance heater, a separate resistance heater shown at 72 may be employed with the rocket of the invention.

When the carbon reaches a reactive temperature, sufficient heat will have been established in the combustion chamber to melt the fusible plug in injection nozzle 34 whereupon the oxidizer from tank section 20 of the rocket will be introduced into the central combustion chamber 46 in direct contact with the heated carbon whereupon high temperature gases will be produced which, on expansion through de Laval nozzle 38 outwardly of the chamber will provide a propelling thrust. The pressure under which the nitrous oxide is stored within the tank section will cause a continuous flow of the gas, controlled in volume by the setting of valve 24, into the combustion chamber for reaction with the heated and/or burning carbon charge whereby a continuous propelling thrust will be acquired to the extent of the time required to exhaust the contents of the tank section.

The vapor pressure of liquid nitrous oxide is about 1000 p.s.i. at normal temperature and thus provides the force for automatically "pumping" the novel oxidizer into the combustion chamber of the rocket substantially simplifying the rocket's pumping system. This property of nitrous oxide combined with its generally unreactive or stable characteristics provides the nitrous oxide-carbon reactive system well suited for use in rockets to be employed by rocket clubs and for demonstration and study purposes.

*Example*

A rocket constructed as shown in the drawings having an overall length of 23 inches and a diameter of about 4 inches is fueled with about 1.6 pounds of liquid nitrous oxide as oxidizer and 1 pound of graphite as the fuel. The fueled rocket weighs about 15 pounds.

The resistance heater was energized and the graphite fuel heated to a reactive temperature of about 1000° F.

The heat from the graphite melted the fusible plug and gaseous nitrous oxide issuing from the nozzle reacted with the graphite to form primarily carbon monoxide and nitrogen. The hot products of combustion issuing from the combustion chamber outlet provides a theoretical specific impulse of about 225 seconds at 1000 p.s.i. expanding to 1 atmosphere.

The system of the example should achieve a velocity close to 900 ft./sec. in horizontal flight and about 700 ft./sec. in vertical flight.

Having thus described and explained operative embodiments of the present invention illustrating the attainment of all of those objects and advantages hereinbefore set forth, and without intention to limit the inventive concepts beyond the requirements of the prior art, what is desired to be claimed is:

In a reaction propulsion vehicle having a storage chamber for nitrous oxide, a reaction chamber in controlled communication with the storage chamber, and a reactive thrust nozzle in thrust producing communication with the reaction chamber; the combination comprising an extended surface solid carbon mass in the reaction chamber, heat producing means in said reaction chamber in heat inducing relationship to said carbon mass to preheat the carbon mass to a temperature at which it will react with the nitrous oxide, and valve means for controlling the flow of nitrous oxide from the storage chamber into contact with the carbon mass subsequent to heating of the carbon mass in the reaction chamber.

References Cited in the file of this patent

UNITED STATES PATENTS

| | | |
|---|---|---|
| 1,596,845 | MacFarlane et al. | Aug. 17, 1926 |
| 2,505,798 | Skinner | May 2, 1950 |
| 2,578,726 | Moore | Dec. 18, 1951 |
| 2,668,412 | Abramson | Feb. 9, 1954 |
| 2,791,883 | Moore et al. | May 14, 1957 |

FOREIGN PATENTS

| | | |
|---|---|---|
| 914,341 | France | June 17, 1946 |
| 316,189 | Switzerland | Nov. 15, 1956 |